March 29, 1932.  H. SCHÜNEMANN  1,851,215
PROCESS FOR MEASURING QUANTITIES OF LOOSE MATERIAL, MORE
PARTICULARLY CUT TOBACCO FOR CONTINUOUSLY FED MACHINES
Filed Nov. 23, 1927
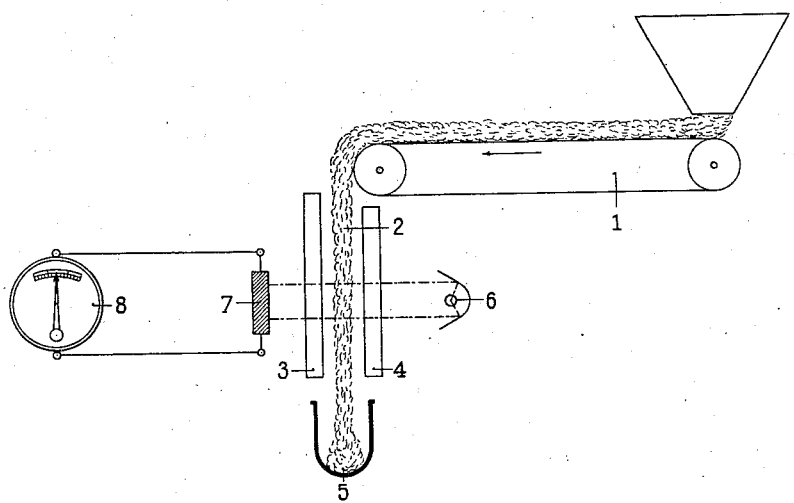
INVENTOR
H. Schünemann Patented Mar. 29, 1932

1,851,215

UNITED STATES PATENT OFFICE

HEINRICH SCHÜNEMANN, OF HAMBURG, GERMANY, ASSIGNOR TO NEUERBURG'SCHE VERWALTUNGSGESELLSCHAFT M. B. H., OF GEREONSHAUS, COLOGNE, GERMANY, A CORPORATION OF GERMANY

PROCESS FOR MEASURING QUANTITIES OF LOOSE MATERIAL, MORE PARTICULARLY CUT TOBACCO FOR CONTINUOUSLY FED MACHINES

Application filed November 23, 1927, Serial No. 235,313, and in Germany December 4, 1926.

In dealing with material which in the form of a flocculent or loose mass is fed by means of a conveyor belt to the further manufacturing devices, for example, in the food stuffs industry, but more particularly in the tobacco industry for feeding the cut tobacco to the rod-forming device on the cigarette machine, it is essential that a uniform feed per second be maintained in order to obtain a definite and exact weight of the finished product. Hitherto it has not been possible to measure exactly and to regulate the quantity of loose material delivered per second, a point of particular importance in the manufacture of cigarettes, in order to ensure that the weight of the latter shall always be uniform, because the continuous working process does not permit of the use of devices for weighing the quantity of loose material fed per second.

The present invention relates to a process which by simple means permits of the continuous supervision and regulation of the quantity of loose material fed per second to the further manufacturing devices. The process according to this invention consists essentially in the circumstance that the density of the cloud of loose material flowing down from the belt which conveys the loose material to the further manufacturing processes, for example, in a cigarette machine to the cigarette rod tape, is directly measured, that is to say, determined with the aid of light and heat radiation, for example, by placing behind the cloud of loose material a source of radiation, a source of light or a source of heat radiation, which is more or less dimmed according to the density of the cloud of loose material, so that the action of an instrument which is sensitive to radiation and which is disposed in front of the cloud of loose material permits of the direct determination of the density of the cloud and of the regulation of the quantity of matter falling in the form of a cloud and which has to be further manufactured.

The process can also be carried out in many different ways by technical, that is to say physical means familiar in themselves. For example, behind the cloud of loose material can be placed a source of light, say, an electric incandescent bulb, the shape of which corresponds suitably to the lateral dispersion of the cloud, and the luminosity of which is as constant as possible, whilst in front of the cloud can be set up a selenium cell or a battery of selenium cells, or other light-sensitive cells or battery of cells, connected directly in the circuit of a measuring instrument or in a shunt therewith, so that the measuring instrument which is under a constant tension will give a smaller or larger throw according to the various resistances (dependent upon the exposure strength) of the light sensitive cells, and by means of its throw measure the density of the cloud of material, so that at a definite density of the cloud to suit the desired weight of the finished product the feed can be regulated easily from time to time.

In place of photoelectric means of measuring, electric heat measuring may be applied by placing, for example, in front of the cloud of matter a source of heat radiation, say an incandescent wire, and behind the cloud of material a suitable instrument, for example, a pyrometer or a bolometer.

A contrivance, in accordance with the present invention, for measuring the density of the cloud of material in cigarette machines is shown by way of example on the drawing.

1 is the conveyor belt which empties on to the cigarette rod tape 5 the tobacco, fed in the form of a cloud 2, between two transparent plates 3 and 4. Behind the plate 4 is placed the source of radiation 6 and in front of the plate 3 the light-sensitive element, preferably a selenium cell 7, directly or indirectly connected in the circuit of the measuring instrument (amperemeter) 8 which should be at a constant tension.

It must be pointed out particularly that in place of the measuring instrument 8 some other control device, for example, an electric relay, can be employed by means of which the variations in the density of the cloud of material can be utilized, in order to regulate the feed device of the cloud of material (for example, the speed of rotation of the feed roller), so that the variations in the density of the cloud of material are kept within very close limits of the average density.

I claim:

A method of measuring tobacco cut to fleece thickness, including the step of depositing the tobacco spread out in the form of a cloud, directing rays through the falling cloud of material, and simultaneously measuring the intensity of the rays transmitted through the cloud.

HEINRICH SCHÜNEMANN.